(12) United States Patent
Metzgen

(10) Patent No.: US 8,019,981 B1
(45) Date of Patent: Sep. 13, 2011

(54) LOOP INSTRUCTION EXECUTION USING A REGISTER IDENTIFIER

(75) Inventor: Paul Metzgen, Chiswick (GB)

(73) Assignee: Altera Corporation, San Jose, CA (US)

( * ) Notice: Subject to any disclaimer, the term of this patent is extended or adjusted under 35 U.S.C. 154(b) by 135 days.

(21) Appl. No.: 10/918,113

(22) Filed: Aug. 12, 2004

Related U.S. Application Data

(60) Provisional application No. 60/534,629, filed on Jan. 6, 2004.

(51) Int. Cl.
*G06F 9/30* (2006.01)
(52) U.S. Cl. ......................... 712/241; 712/233
(58) Field of Classification Search ............ 712/241
See application file for complete search history.

(56) References Cited

U.S. PATENT DOCUMENTS

| | | | | |
|---|---|---|---|---|
| 5,375,238 A | * | 12/1994 | Ooi | 712/241 |
| 5,442,581 A | * | 8/1995 | Poland | 708/653 |
| 5,734,880 A | * | 3/1998 | Guttag et al. | 712/221 |
| 5,812,472 A | * | 9/1998 | Lawrence et al. | 365/201 |
| 6,834,338 B1 | * | 12/2004 | Hoyle et al. | 712/234 |
| 2002/0144092 A1 | * | 10/2002 | Topham et al. | 712/217 |
| 2006/0107028 A1 | * | 5/2006 | Meuwissen et al. | 712/241 |

OTHER PUBLICATIONS

Becker; "Configurable Systems-on-Chip (CSoC)"; 2002; IEEE.*
TI-85 Assembler Programming—Loops using DJNZ, http://www.sealiesoftware.com/ti-asm/ti-djnz.html, printed on Aug. 3, 2005, 1 page.
White, Donnamaie E., "Bit-Slice Design: Controllers and ALUs", Bit Slice Design—D.E. White—Chap. 4—Refining the CCU, Last Edit Nov. 2, 1996; May 1, 1999; Jul. 7, 2001, pp. 1-12.

* cited by examiner

*Primary Examiner* — Alford W Kindred
*Assistant Examiner* — Benjamin P Geib
(74) *Attorney, Agent, or Firm* — Weaver Austin Villeneuve & Sampson LLP

(57) ABSTRACT

Methods and apparatus are provided for performing loop execution. Modifier registers are used to hold loop counter values. Modifier register information and program memory address information are included in the loop instruction. When a processor executes a loop instruction, it decodes the instruction, identifies the modifier register, and accesses the register value to determine if the processor will jump back based on the memory address information. The loop execution can incur no clock cycle penalties.

30 Claims, 8 Drawing Sheets

| | Loop Counter 301 | | | Relative Address 303 |
|---|---|---|---|---|
| m0 | 0 | 0 | 0 | |
| m1 | 0 | 0 | 1 | |
| m2 | 0 | 1 | 0 | |
| m3 | 0 | 1 | 1 | |
| m4 | 1 | 0 | 0 | |
| m5 | 1 | 0 | 1 | |
| m6 | 1 | 1 | 0 | |
| m7 | 1 | 1 | 1 | |

Figure 3

LOOP INSTRUCTION EXECUTION USING A REGISTER IDENTIFIER

CROSS REFERENCE TO RELATED APPLICATIONS

This application claims benefit of priority under 35 U.S.C. 119(e) of (i) U.S. Provisional Application No. 60/534,629 filed Jan. 6, 2004 and titled "CONDITIONAL EXECUTATION USING A PROCESSOR FLAG", the entirety of which is incorporated by reference for all purposes.

BACKGROUND OF THE INVENTION

1. Field of the Invention

The present invention relates to loop instructions. In one example, the present invention relates to methods and apparatus for using modifier registers to implement loop instructions.

2. Description of Related Art

Various hardware devices such as general purpose processors, cryptography accelerators, video accelerators, digital signal processing (DSP) processors, and microcontrollers are capable of performing loop operations. Loop operations involve having a processor repeatedly execute a sequence of instructions on different data sets. For example, Fast Fourier Transform (FFT) operations involve the use of inner loops to perform instructions on multidimensional data sets.

In some instances, loops are nested within other loops. For example, inner loop operations may be called during the execution of a particular cycle of an outer loop operation. In some instances, loop can be nested within loops leading to significant nesting depth. However, conventional mechanisms for handling loops and particularly nested loops are limited. Consequently, it is desirable to provide improved techniques and mechanisms for performing loop execution.

SUMMARY OF THE INVENTION

Methods and apparatus are provided for performing loop execution. Modifier registers are used to hold loop counter values. Modifier register information and program memory address information are included in the loop instruction. When a processor executes a loop instruction, it decodes the instruction, identifies the modifier register, and accesses the register value to determine if the processor will jump back based on the memory address information. The loop execution can incur no clock cycle penalties.

In one embodiment, a method for executing loop instructions is provided. A register identifier and address information is encoded in a loop instruction supported in the instruction set of a processor. The loop instruction is executed by decoding the register identifier and the address information associated with the loop instruction and accessing a loop counter value using the register identifier. If the loop counter value is greater than zero, a jump is made using the address information in the loop instruction.

In another embodiment, a processor is provided. The processor includes an arithmetic logic unit and a modifier register. The arithmetic logic unit is operable to perform operations associated with an instruction set supported by the processor. The modifier register is associated with an address register. The modifier register is operable to hold a loop counter value used during execution of a loop instruction having an encoded modifier register identifier and a relative address.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIG. 3 is a diagrammatic representation showing loop instruction coding.

DETAILED DESCRIPTION OF SPECIFIC EMBODIMENTS

Figure 1:
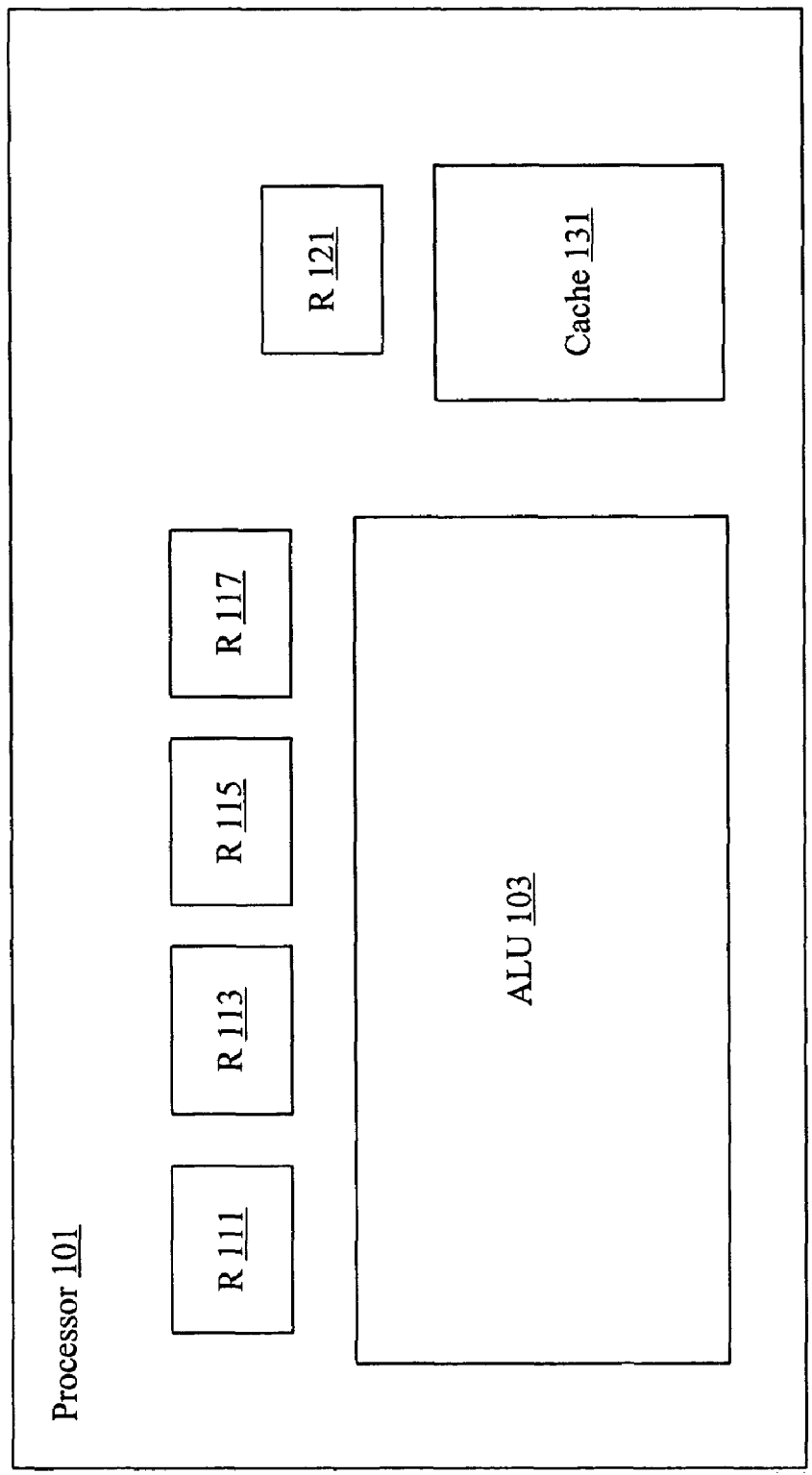
FIG. 1 is a diagrammatic representation of a processor.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processors and memory.

For example, the techniques of the present invention will be described in the context of particular processors and instructions. However, it should be noted that the techniques of the present invention can be applied to a variety of types of processors and instructions. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Conventional processors such as general purpose processors, digital signal processing (DSP) processors, video accelerators, cryptography accelerators, and other hardware devices typically include logic for executing instructions and have a number of registers for storing data and address information. The registers are often used to hold information that is frequently accessed by a particular processor. For example, data registers can be used to hold data that the processor often uses. Address registers can be configured to hold program memory addresses that the processor frequently accesses.

A variety of algorithms including digital signal processing algorithms have significant loop processing. That is, essentially the same instructions are executed on slightly different sets of data. For example, a particular operation may be applied to all of the data points in a series using a loop. Individual loops can also call subloops or nested loops. Nested loops can be particularly useful in processing multi-dimensional data sets.

Many conventional processors maintain special loop specific registers to handle loop operations. During a particular loop, a processor typically keeps track of the number of loops remaining, the program memory start address, and a program memory end address. The program memory start and end addresses indicate instructions that the processor should execute during a particular loop. A loop counter is used to indicate how many loops remain. Consequently, typical processors maintain three registers to hold the three pieces of information. One register operates as a loop counter, another register holds program memory start address, and a third register holds a program memory end address.

Providing three registers to perform each loop is relatively straightforward if the use of loops and nested loops are infrequent. However, some algorithms entail the use of nested loops or loop instructions that call other loop instructions during each particular cycle. With nested loops, register requirements can grow quickly. For example, a top-level loop may be configured to execute using three registers. During each execution, another loop instruction is called entailing the use of at least another three registers. Each nested loop can call yet another nested loop. By using registers to handle loops, nesting depth is limited by the number of loop registers available. In many instances, registers can be expensive to implement, particularly on programmable chips. Consequently, nesting depth is limited based on loop register availability. This can often be a significant limitation.

Consequently, the techniques and mechanisms of the present invention provide support for loops without using loop specific registers. A different type of register is used as a loop counter. In one example, a more generic register not specifically allocated for loops is used as a loop counter. Other information for performing loop is included in the instruction itself. Consequently, less loop state information such as program memory addresses and loop counter values are maintained within the processor. In some example, no loop state information is maintained by the processor. Instead, loops state information is managed using the instruction itself. In one example, address modifier registers are used as loop counters.

Address modifier registers are particularly convenient for operating as loop counters because they allow for parallel modification of the register value after the value has been used for a load or store operation. In one example, the register value can be read and decremented in the same operation. The parallel modification removes any cycle time penalty associated with using a register. Jump addresses are included in the instruction itself along with an indicator identifying the particular modifier register used.

Consequently only a single register is needed for each particular loop. Conventional implementations used three registers. A nesting depth is now limited only to the number on modifier registers available, instead of being limited to one-third of the number of loop registers available. A processor typically has as many modifier registers as it has address registers.

FIG. 1 is a diagrammatic representation showing a processor. The processor can include circuitry such as an arithmetic logic unit ALU 103 or any other circuitry operable to execute instructions in a supported instruction set. The processor 101 also includes multiple registers 111, 113, 115, 117, and 121. The registers may be configured as data registers, address registers, loop registers, modifier registers, etc. A processor can also include a cache 131 to hold frequently or imminently accessed values.

To increase efficiency for performing data-intensive portions of algorithms, a processor 101 such as digital signal processing (DSP) processor provides a loop or repeat-block instruction to repeat a series of instructions. The loop or repeat-block instruction is often provided with zero overhead. The is, the loop repeat is performed without incurring extra clock cycles.

Figure 2:
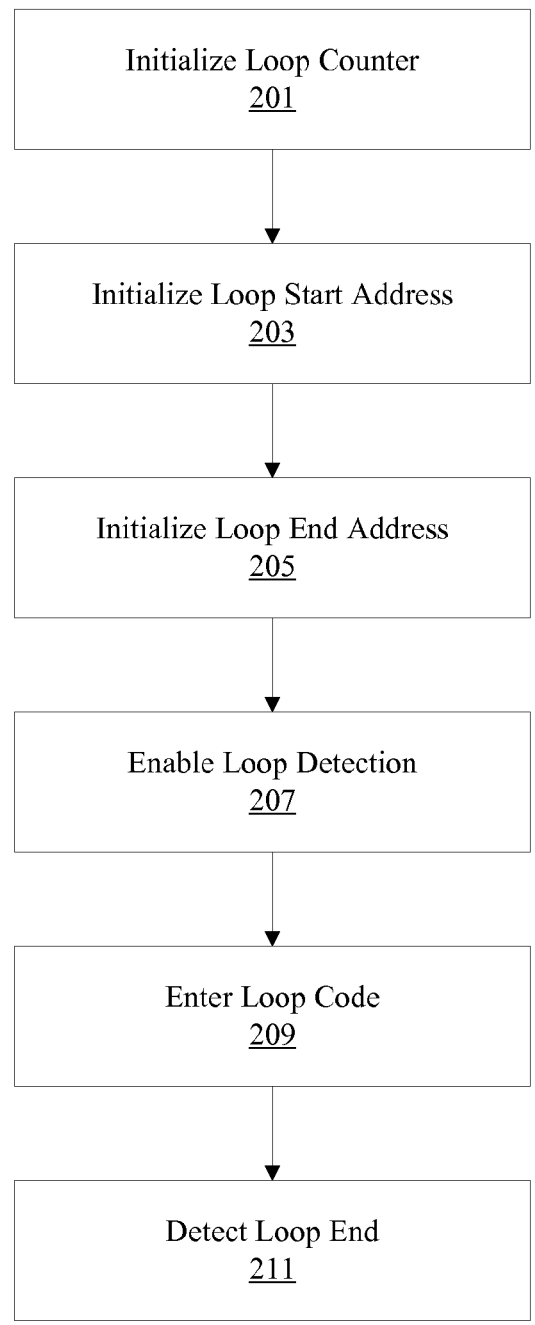
FIG. 2 is a diagrammatic representation showing a conventional loop operation using loop registers.

FIG. 2 is a flow process diagram showing one technique processors typically use to handle loop instructions. Most processors need to store at least three values for a zero-overhead loop. The three values include a program memory address for the first instruction in the loop, a program memory address for the last instruction in the loop, and a loop counter that decrements every time the loop is executed. Typically, the values are stored in loop-specific registers. To support nested loops or loops within loops, each nested loop includes it own set of loop-specific registers.

Conventional mechanisms for handling loops are available. One type is Do Jump if loop counter Not Zero (DJNZ). The technique includes initializing a loop counter, marking up start with a label, entering loop code, and executing DJNZ at end. The technique can be implemented using the following code:

```
MOVE LC0, 16
loop_start:
ADD r0, r1, r0
<more code>
DJNZ LC0, loop_start
```

The DJNZ instruction contains the relative address for the jump to the loop start address. Processors that support nesting will encode the appropriate loop counter in the instruction.

To use full hardware support, the following technique can be used. In one example, a loop counter is initialized, a loop start address is initialized, a loop end address is initialized, loop detection is enabled, loop code is entered, and the hardware detects the end of the loop. The following code can be used to implement hardware support:

```
MOVE LC, 16
MOVE LSA, loop_1_start
MOVE LSE, loop_1_end
EN_LOOP 1
loop_1_start:
ADD r0, r1, r0
<more code>
loop_1_end:
```

The hardware will detect the end of the loop, and test the counter for a zero. If the counter is positive, a jump is made back to the stored start address and the counter is decremented. Nesting is limited by the amount of hardware support, typically 4 levels.

In one example, a loop counter is initialized at 201, a loop start address is initialized at 203, and a loop end address is initialized at 205. Initializing the loop counter, the loop start address, and the loop end address may entail writing values to loop specific registers. Loop detection is enabled at 207 and loop code is entered at 209. A loop end is detected at 211 when a loop counter typically reaches zero. During each cycle, register accesses are used to determine program memory addresses and loop counter values.

However, conventional implementations limit the use of nested loops. For some DSP processors, loop counter registers are saved and restored around each nested loop. Having to allocate dedicated registers for loops and additional registers for nested loops can be inefficient. In one example, limited registers may be available for a particular processor. Furthermore, conventional implementations require that the processor keep state information about start and end of loop addresses in order to detect the loop end and know where to jump back to. This requires additional resources in the processor.

Consequently, the techniques of the present invention provide mechanisms for re-using address modifier registers as loop counters. Zero overhead loops can be implemented with no loop-specific registers. In one embodiment, zero overhead loops are implemented by re-using existing registers for loop counters, and encoding the loop start address within instructions explicitly. No specific loop counter registers are required. Available nesting depth is increased to the number of modifier registers. Furthermore, placing the modifier and jump address in the instruction avoids the need for loop state inside processor.

Address modifier registers are conventionally used to post-modify (add/subtract a value from) an address register after it has been used in a load or store operation. Any register used to hold a modifiable value is referred to herein as a modifier register. In one example, the modifier register is an address modifier register that allows postmodification with no cycle penalties. One example is shown as follows:

MOVE m0, 5 initialise modifier m0 to the value 5
LOAD d0, [a0]m0 load reg d0 with contents of memory location pointed to by a0. Postmodify a0 by m0 (add 5 to a0).

According to various embodiments of the present invention, modifier registers are used as loop counters in the following manner:

Loop_start:
  op1;
  op2;
  LOOP m7, Loop_start||op3;

According to various embodiments, m7 is a modifier register. The LOOP instruction says "LOOP control back to the instruction at Loop_start if the value stored in m7 is greater than zero, and decrement the value in m7 by one." The "||op3" denotes that op3 will be executed in parallel with the LOOP instruction.

By acting in parallel with op3, the LOOP instruction can be executed at the same time as op3, hence incurring no additional clock cycles. A processor will commonly have as many modifiers as it has address registers. By using modifiers as loop counters the processor need not have any dedicated loop counter registers.

The techniques of the present invention increase efficiency of nested loops. There is a maximum depth of nested loops before modifiers have to be saved and restored across loops. The depth is equal to the number of modifiers. According to various embodiments of the present invention, the number of nested loops that can be used is significantly greater than for processors with loop counter registers. The following example shows how loops can be nested, using modifiers:

start1:
  op1;
  start2:
    op2;
    start3:
      op3;
      LOOP m3, start3||op4;
    LOOP m2, start2||op5;
  LOOP m1, start1||op6;

According to various embodiments, no internal loop state is needed.

FIG. 3 shows one example of LOOP instruction coding to remove the internal loop state requirement. The modifier register identifier is shown in field 301 and the relative address is provided in field 303. The LOOP instruction encodes both the modifier register (here m0 to m7) and a relative address for the jump. In one example, when the processor executes the LOOP instruction, it decodes the instruction, decodes which loop counter and accesses its value. If the value is greater than zero, it will jump back by the magnitude of the relative address stored in the instruction and decrement the modifier. No other information or internal state is required to execute the instruction. The LOOP incurs no overhead when executed in parallel with another instruction.

Figure 4:
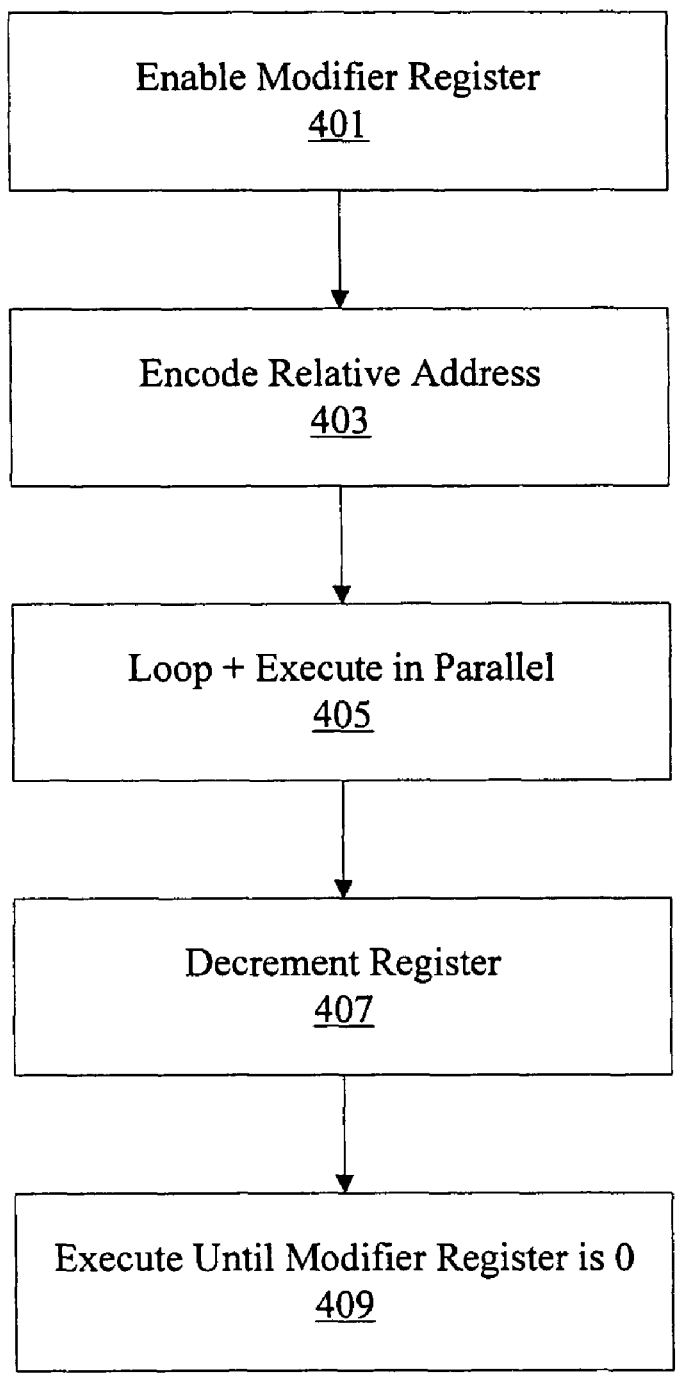
FIG. 4 is a flow process diagram showing one technique for executing a loop instruction.

FIG. 4 is a diagrammatic representation showing one technique for using a modifier register. At 401, a modifier register is enabled. According to various embodiments, the modifier register is used as a loop counter that can be modified without any clock cycle penalties during loop execution. At 403, a relative address is encoded. The relative address may direct a processor to read program memory at an address having a particular offset from the current address. At 405, a loop instruction is called while another operation is executed in parallel. The loop instruction includes information on the loop counter and the relative address. Another instruction is executed optionally to incur no overhead. At 407, the modifier register is decremented. At 409, execution of loop instructions is performed until the modifier register reaches 0.

Although the techniques and mechanisms of the present invention are applicable to a variety of different devices including general purpose processors, video accelerators, cryptography accelerators, digital signal processors, microcontrollers, etc., the techniques and mechanisms of the present invention are particularly applicable to programmable chips. Implementing conventional mechanisms such as loop specific registers for handling loop execution is typically expensive on a programmable chip.

Figure 5:
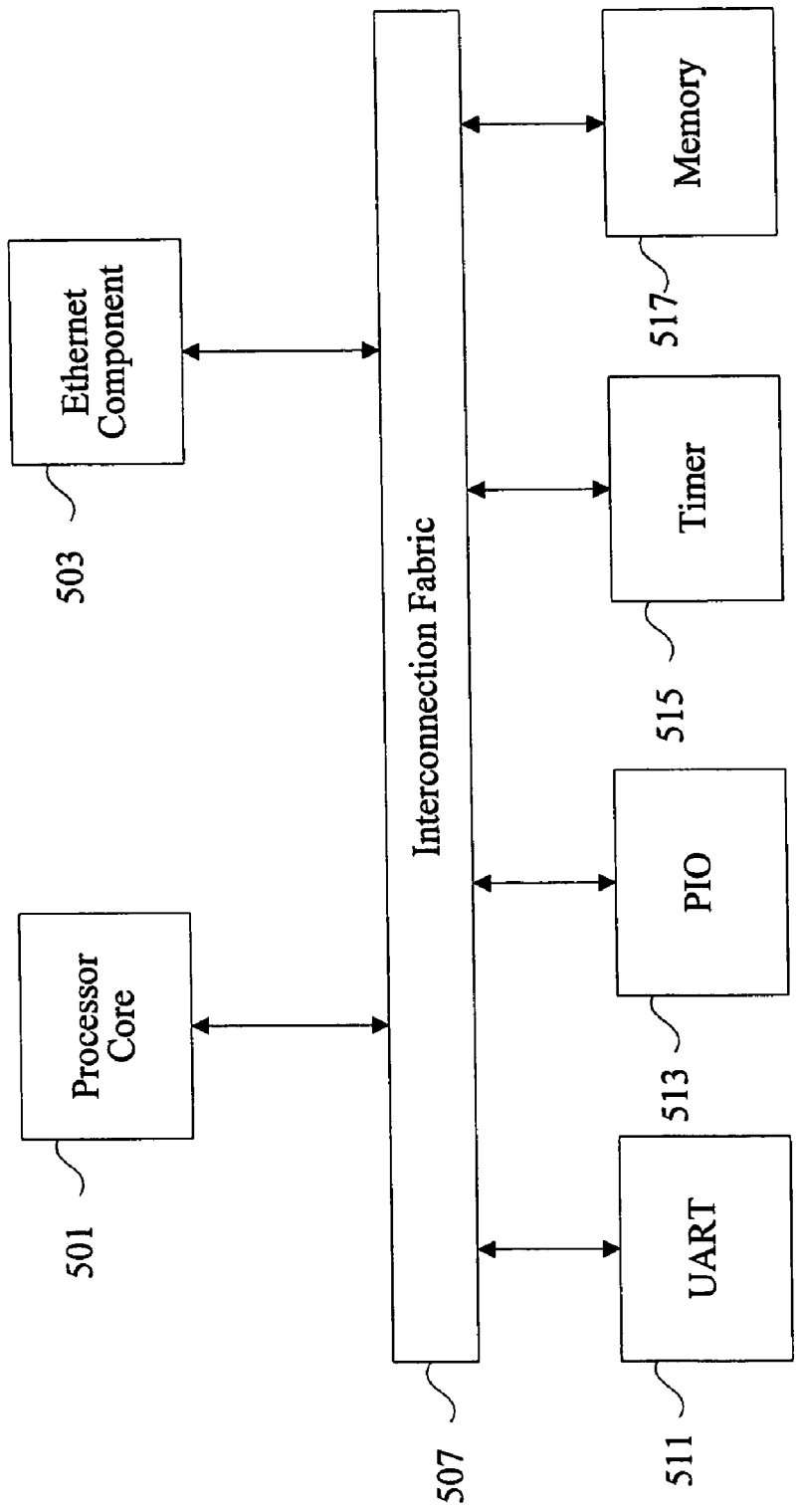
FIG. 5 is a diagrammatic representation showing a programmable chip system.

FIG. 5 is a diagrammatic representation showing one example of a system on a programmable chip that can be used to implement the techniques of the present invention. The system includes a processor core, a hardware accelerator, peripheral devices, and peripheral interfaces. Peripheral devices and peripheral interfaces are herein referred to as components. The system on a programmable chip includes processor core 501 and an Ethernet component 503 as well as peripheral components UART 511, PIO 513, timer 515, and data memory 517. In some examples, the Ethernet component 103 is instead a Digital Signal Processing (DSP) core, a cryptography accelerator, or a video processor. It should be noted that the system can include both on-chip memory 517 and off-chip memory. In one example, the data memory 517 can support variable latency or fixed latency access. The components are interconnected using an interconnection fabric 507. Any mechanism or logic for connecting components in a system is referred to herein as an interconnection fabric. In one example, the interconnection fabric is a bus. In another example, the interconnection fabric is a secondary side arbitration fabric.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of lookup tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register. In other examples, a logic element is an adaptive logic module (ALM) that provides 8 inputs, allowing it to efficiently support various configurations such as 6-input or 7-input lookup tables or two independent 4-input lookup tables.

The techniques and mechanisms of the present invention allow the implementation of a system on a programmable chip from a high-level language program. In one example, variable latency and fixed latency can be supported on a system using a conventional bus architecture.

A system bus typically has a set width (e.g. 64 bits, 128 bits) and allows only one primary component to actively use the bus at any one time. In conventional systems, only one primary component can access any one of the given secondary components at any given time. Multiple primary components accessing secondary components in a manner that would cause data bit collisions if performed on the same data lines is referred to herein as accessing secondary components at the same time.

In one example, an Ethernet component is accessing a secondary PIO. While the Ethernet component is accessing the secondary PIO, a processor can not access an SDRAM through a peripheral interface even if both the primary streaming output device and the peripheral interface are available.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip or a programmable device. Instead of implementing complicated bus sharing schemes using mechanisms such as splitting, the bus itself can be eliminated to improve system performance.

According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed. Furthermore, by not using a bus, interconnection flexibility is enhanced. For example, an Ethernet component can be allocated a variety of ports for directly accessing a memory and the only resource in contention would be the memory.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. The techniques of the present invention recognize that Ethernet component support for high-level language programs can be more efficiently and effectively provided in a system by using secondary side arbitration.

Figure 6:
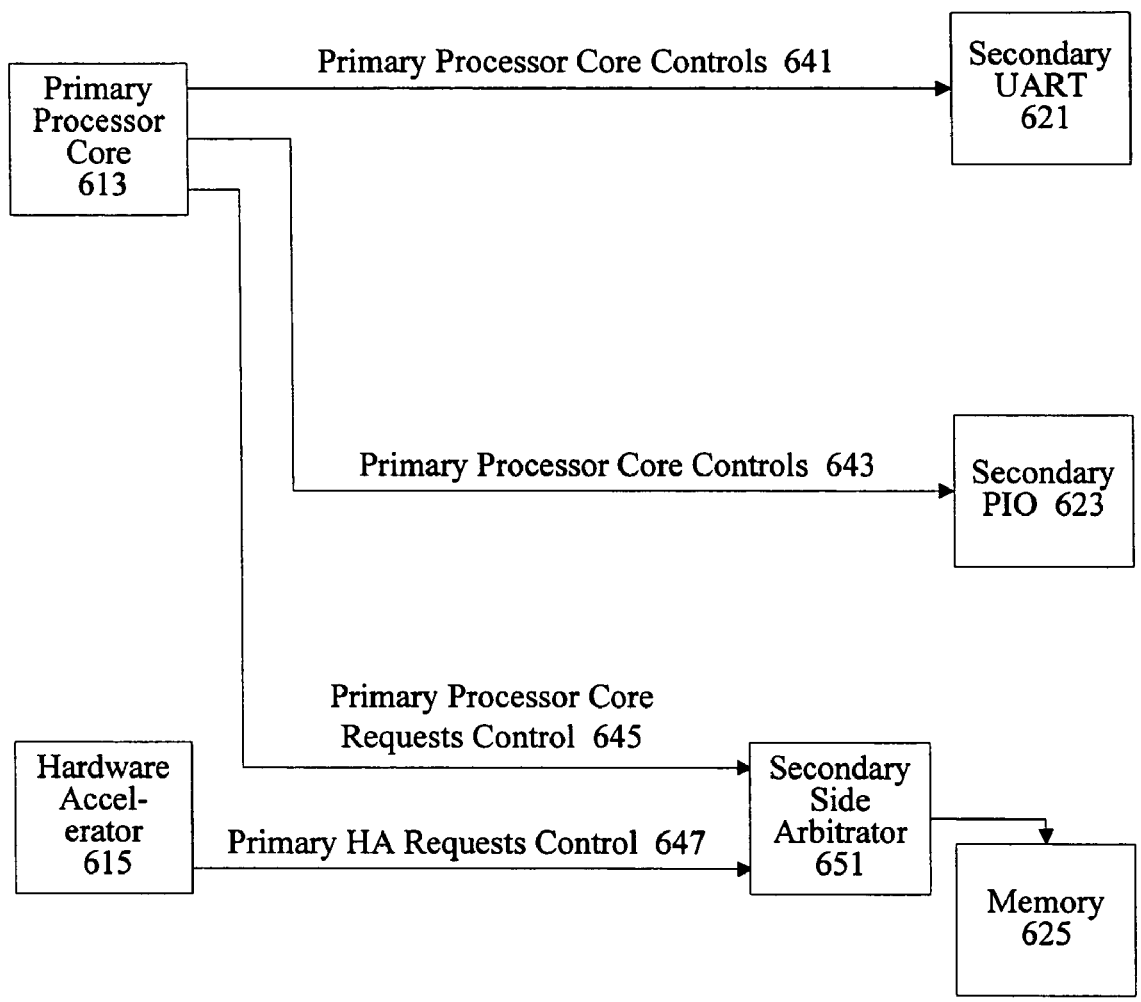
FIG. 6 is a diagrammatic representation showing an interconnection fabric.

FIG. 6 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments, a secondary component such as memory 625 is associated with a secondary side arbitrator 651. However, secondary components UART 621 and PIO 623 are not associated with any arbitrator. In one example, secondary component UART 621 and secondary PIO 623 can only be accessed by primary CPU 613 and not by primary hardware accelerator 615. A secondary memory component 625, however, can be accessed by both primary CPU 613 and primary hardware accelerator 615.

According to various embodiments, a secondary side arbitrator 651 allows a first secondary component in a system to be accessed by a first primary component at the same time a second secondary component in the system is accessed by a second primary component. For example, memory 625 can be accessed by hardware accelerator 615 through secondary side arbitrator 651 at the same time, secondary UART 621 is accessed by primary CPU 613.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

Figure 7:
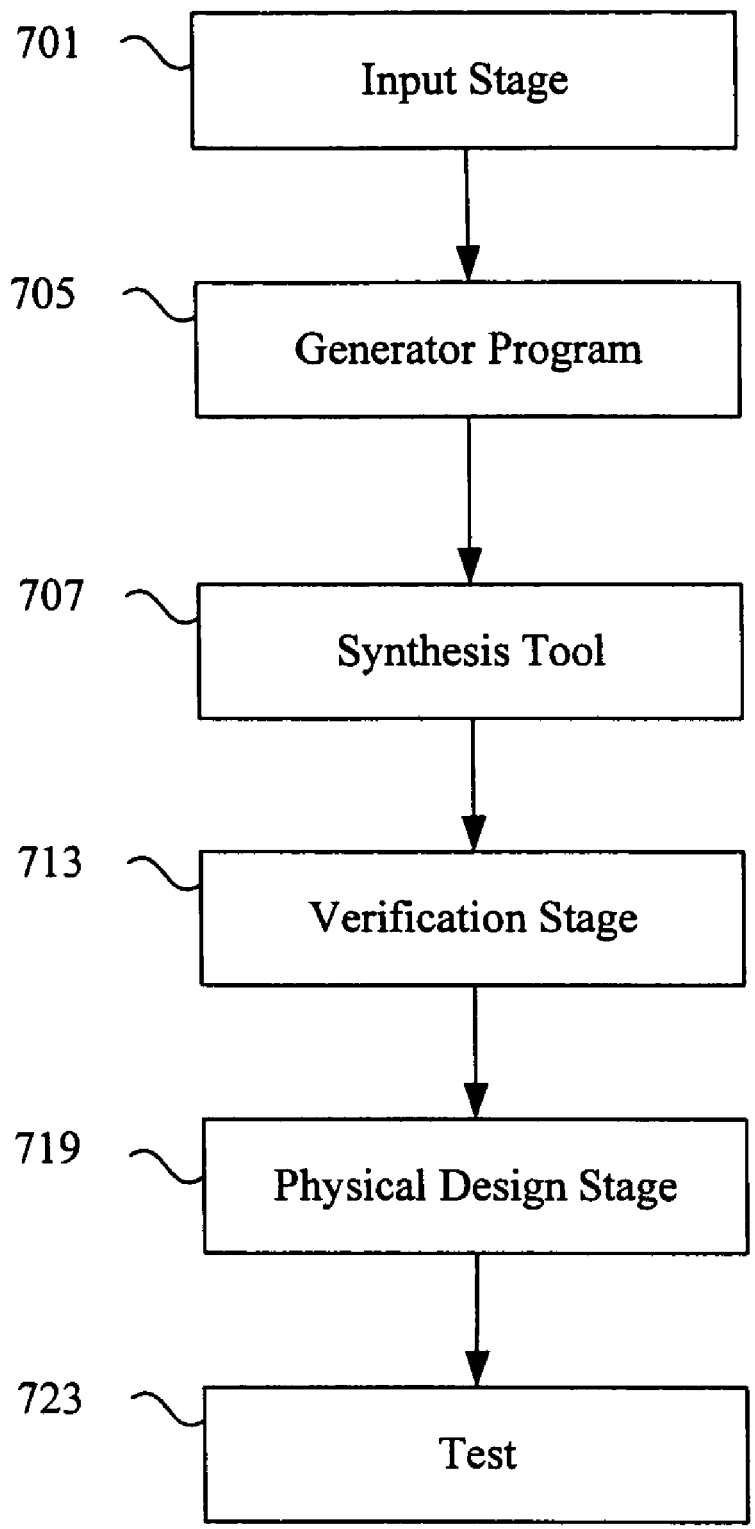
FIG. 7 is a diagrammatic representation showing a technique for implementing the programmable chip.

FIG. 7 is a diagrammatic representation showing implementation of a system on a programmable chip. An input stage 701 receives selection information typically from a user for logic such as a processor core as well as other components such as a streaming output device to be implemented on an electronic device. In one example, the input received is in the form of a high-level language program. A generator program 705 creates a logic description and provides the logic description along with other customized logic to any of a variety of synthesis tools, place and route programs, and logic configuration tools to allow a logic description to be implemented on an electronic device.

In one example, an input stage 701 often allows selection and parameterization of components to be used on an electronic device. The input stage 701 also allows configuration of variable or fixed latency support. In some examples, components provided to an input stage include intellectual property functions, megafunctions, and intellectual property cores. The input stage 701 may be a graphical user interface using wizards for allowing efficient or convenient entry of information. The input stage may also be a text interface or a program reading a data file such as a spreadsheet, database table, or schematic to acquire selection information. The input stage 701 produces an output containing information about the various modules selected.

In typical implementations, the generator program 705 can identify the selections and generate a logic description with information for implementing the various modules. The generator program 705 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 705 identifies pointers and provides ports for each pointer. One tool with generator program capabilities is System on a Programmable Chip (SOPC) Builder available from Altera Corporation of San Jose, Calif. The generator program 705 also provides information to a synthesis tool 707 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 701, generator program 705, and synthesis tool 707 can be separate programs. The interface between the separate programs can be a database file, a log, or simply messages transmitted between the programs. For example, instead of writing a file to storage, the input stage 701 can send messages directly to the generator program 705 to allow the generator program to create a logic description. Similarly, the generator program can provide information directly to the synthesis tool instead of writing HDL files. Similarly, input stage 701, generator program 705, and synthesis tool 707 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 707.

A synthesis tool 707 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 713 typically follows the synthesis stage 707. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 713, the synthesized netlist file can be provided to physical design tools 719 including place and route and configuration tools. A place and route tool typically locates logic cells on specific logic elements of a target hardware device and connects wires between the inputs and outputs of the various logic elements in accordance with logic required to implement an electronic design. The device can also be physically tested at 723.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 701, the generator program 705, the synthesis tool 707, the verification tools 713, and physical design tools 719 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 8:
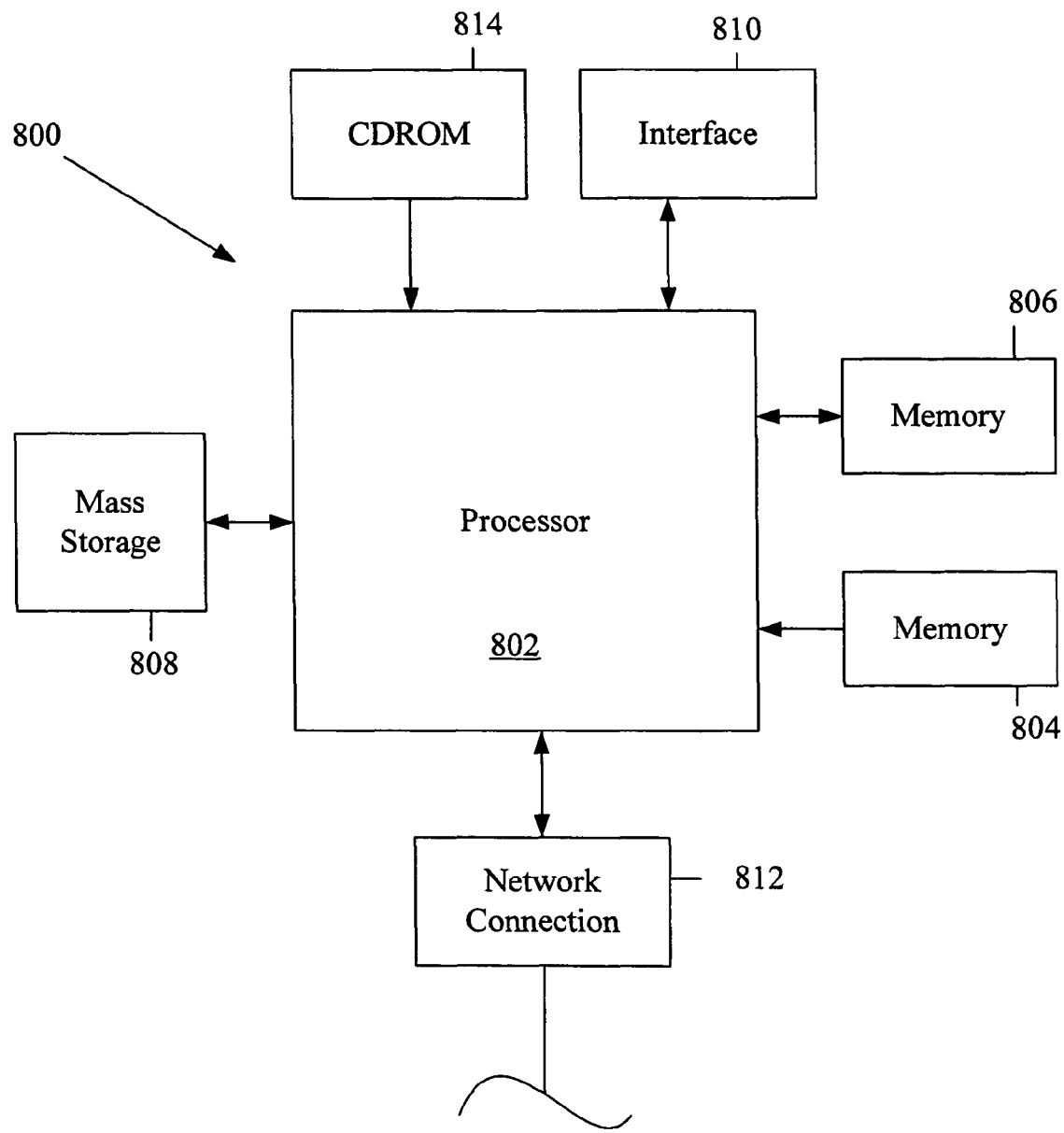
FIG. 8 is a diagrammatic representation depicting a computer system.

FIG. 8 illustrates a typical computer system that can be used to implement a programmable chip. The computer system 800 includes any number of processors 802 (also referred to as central processing units, or CPUs) that are coupled to devices including memory 806 (typically a random access memory, or "RAM"), memory 804 (typically a read only memory, or "ROM"). The processors 802 can be configured to generate a test sequences for any designated processor. As is well known in the art, memory 804 acts to transfer data and instructions uni-directionally to the CPU and memory 806 is used typically to transfer data and instructions in a bi-directional manner.

Both of these memory devices may include any suitable type of the computer-readable media described above. A mass storage device 808 is also coupled bi-directionally to CPU 802 and provides additional data storage capacity and may include any of the computer-readable media described above. The mass storage device 808 may be used to store programs, data and the like and is typically a secondary storage medium such as a hard disk that is slower than memory. The mass storage device 808 can be used to hold a library or database of prepackaged logic or intellectual property functions, as well as information on generating particular configurations. It will be appreciated that the information retained within the mass storage device 808, may, in appropriate cases, be incorporated in standard fashion as part of memory 806 as virtual memory. A specific mass storage device such as a CD-ROM 814 may also pass data uni-directionally to the CPU.

CPU 802 is also coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. It should be noted that the system 800 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 808 or 814 and executed on CPU 808 in conjunction with primary memory 806.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of processors and instruction lengths and should not be restricted to the ones mentioned above. It is therefore intended that the invention be interpreted to include all variations and equivalents that fall within the true spirit and scope of the present invention.

What is claimed is:

1. A method comprising:
   receiving, within a loop instruction, an address associated with a first nested loop, wherein the first nested loop includes the loop instruction;
   receiving, within the loop instruction, a register identifier identifying a first register of a processor;
   determining whether a value stored in the first register is greater than zero, wherein said value is associated with a number of times the first nested loop has been executed; and
   decrementing the value and performing an operation in parallel with the decrementing in response to determining that the value stored in the first register is greater than zero.

2. The method of claim 1 further comprising executing the loop instruction, wherein said executing the loop instruction comprises said decrementing and looping back to the first nested loop, wherein said executing the loop instruction occurs during a same clock cycle as the operation.

3. The method of claim 1 further comprising executing the first nested loop during execution of a second loop.

4. The method of claim 1 further comprising counting, by the first register, a number of iterations of execution of the first nested loop.

5. The method of claim 1 further comprising executing a second loop by using a second register of the processor, wherein the second loop comprises the first nested loop.

6. The method of claim 1 further comprising:
   loading a register with content of a memory location pointed to by an address register of the processor; and
   subsequent to said loading, modifying content of the address register of the processor using the first register.

7. The method of claim 1, further comprising:
   loading a register with content of a memory location pointed to be an address register of the processor; and
   subsequent to said loading, modifying content of the address register of the processor using the first register, wherein said loading and said modifying are performed in a single clock cycle.

8. The method of claim 1, wherein the processor of a system on a programmable chip receives the address and the register identifier.

9. The method of claim 1, wherein said operation is associated with a load operation or a store operation.

10. The method of claim 1, further comprising executing the loop instruction, wherein said executing the loop instruction comprises said decrementing and looping back to the first nested loop.

11. A processor comprising:
    an execution circuit operable to execute a loop instruction within a first nested loop; and
    a first register operable to be identified by a register identifier within the loop instruction,
    wherein the loop instruction includes a program memory address associated with the first nested loop,
    wherein the execution circuit is operable to determine whether a value stored in the first register is greater than zero, wherein the value is associated with a number of times the first nested loop has been executed, and
    wherein, in response to determining that the value stored in the first register is greater than zero, the execution circuit is operable to decrement the value and perform an operation in parallel.

12. The processor of claim 11, wherein the execution circuit is operable to execute the loop instruction to decrement the value and to loop back to the first nested loop, wherein the loop instruction is executed in a same clock cycle as the operation.

13. The processor of claim 11, wherein the execution circuit is operable to execute the first nested loop during execution of a second loop.

14. The processor of claim 11, wherein the first register is operable to count a number of iterations of execution of the first nested loop.

15. The processor of claim 11, further comprising a second register, wherein the execution circuit is operable to execute a second loop by using the second register, and wherein the execution of the first nested loop is nested within the execution of the second loop.

16. The processor of claim 11, further comprising an address register and an additional register, wherein the additional register is operable to load data stored at a memory location pointed to by the address register, wherein the first register is operable to modify content of the address register subsequent to the loading.

17. The processor of claim 11, further comprising an address register and an additional register, wherein the additional register is operable to load data stored at a memory location pointed to by the address register, wherein the first register is operable to modify content of the address register subsequent to the loading, wherein the additional register is operable to perform the loading in a same clock cycle in which the first register is operable to perform the modification.

18. The processor of claim 11, wherein the processor is a part of a system on a programmable chip.

19. The processor of claim 11, wherein the operation is associated with a load operation or a store operation.

20. The processor of claim 11, wherein the execution circuit is operable to execute the loop instruction to decrement the value and to loop back to the first nested loop.

21. A system comprising:
first means for modifying; and
means for receiving, within a loop instruction in a first nested loop, a program memory address associated with the first nested loop and receiving, within the loop instruction, a register identifier identifying the first means for modifying,
wherein the means for receiving determines whether a value stored in the first means for modifying is greater than zero, wherein the value is associated with a number of times the first nested loop has been executed, and
wherein the means for receiving decrements the value and performs an operation in parallel in response to determining that the value stored in the first means for modifying is greater than zero.

22. The system of claim 21, wherein the means for receiving decrements the value during an execution of the loop instruction, wherein the means for receiving loops back to the first nested loop during the execution of the loop instruction, wherein the loop instruction is executed in a same clock cycle as the operation.

23. The system of claim 21, wherein the means for receiving performs an execution of the first nested loop during execution of a second loop.

24. The system of claim 21, wherein the first means for modifying counts a number of iterations of execution of the first nested loop.

25. The system of claim 21, further comprising second means for modifying, wherein the means for receiving executes a second loop by using the second means for modifying, wherein the execution of the first nested loop is nested within the execution of the second loop.

26. The system of claim 21, further comprising:
means for addressing; and
means for registering, wherein the means for registering is loaded with content of a memory location pointed to by the means for addressing, wherein the first means for modifying modifies, subsequent to the loading, content of the means for addressing.

27. The system of claim 21, further comprising:
means for addressing; and
means for registering, wherein the means for registering is loaded with content of a memory location pointed to by the means for addressing, wherein the first means for modifying modifies, subsequent to the loading, content of the means for addressing, wherein the loading and the modifying are performed in a same clock cycle.

28. The system of claim 21, wherein the system includes a system on a programmable chip configured using a hardware descriptor language (HDL).

29. The system of claim 21, wherein the operation is associated with a load operation or a store operation.

30. The system of claim 21, wherein the means for receiving decrements the count during an execution of the loop instruction, wherein the means for receiving loops back to the first nested loop during the execution of the loop instruction.

* * * * *